May 3, 1927.

J. WATKINS

CONFECTION MOLD

Filed Oct. 9, 1926

1,627,421

Joseph Watkins
INVENTOR

BY *Victor J. Evans*
ATTORNEY

WITNESS: *R. E. Wise*

Patented May 3, 1927.

1,627,421

UNITED STATES PATENT OFFICE.

JOSEPH WATKINS, OF MARYSVILLE, PENNSYLVANIA.

CONFECTION MOLD.

Application filed October 9, 1926. Serial No. 140,565.

This invention relates to a baking pan or mold, the general object of the invention being to provide means whereby a cake or other confection can be formed with a recess in its center so that when two of such cakes are placed together, a recess will be formed in the center of the combined cakes for receiving ice cream or other matter.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

In these views, 1 indicates a baking pan or mold for receiving the cake material or other material from which the confection is to be made. A bracket 2 is fastened to a part of the exterior wall of the pan and a forked member 3 has its lower end removably supported by the bracket so that the member is held in upright position. A substantially egg-shaped member 4 has a U-shaped member 5 fastened thereto, with the extremities of the said member 5 provided with eyes for engaging the eyes at the extremities of the fork-shaped member 3, as shown at 6, so that the member 5 is hingedly connected with the member 3.

Figure 1:
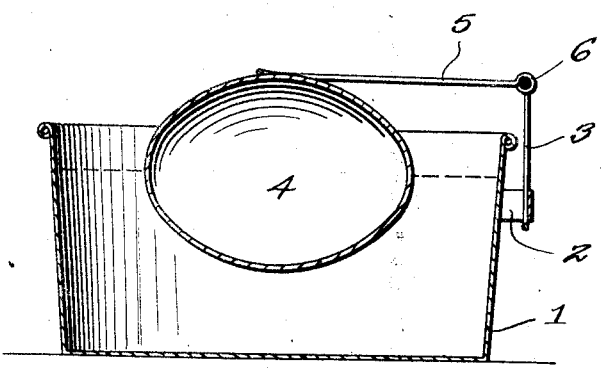
Figure 1 is a section on line 1—1 of Figure 3.
Figure 2:
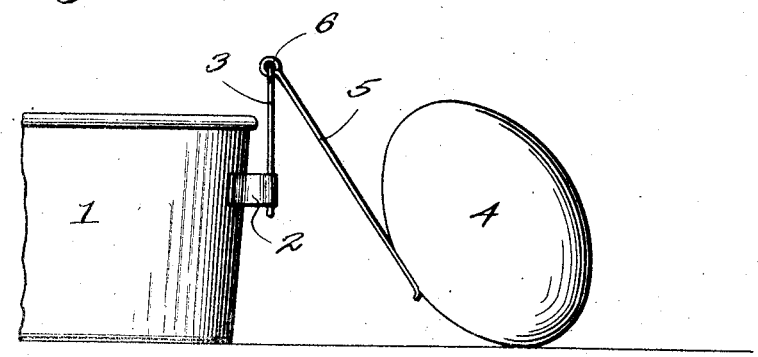
Figure 2 is a fragmentary elevation with the recess forming member in inoperative position.
Figure 3:
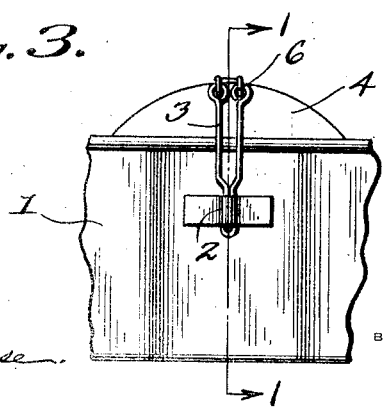
Figure 3 is a fragmentary view of Figure 1, showing how the recess forming member is hingedly supported.

The cake or other material is placed in the pan and then the member 4 is swung from the position it occupies in Figure 2 to that which it occupies in Figure 1, so that it will form a recess in the center of the cake and after the cake is baked, the recess will remain therein. A second cake is then baked in the same manner and then ice cream or other matter is placed in the recess in each cake and then the two cakes are placed together with the recesses registering with each other. Thus a cake is produced which is formed with a space in its interior to receive ice cream or other material.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A baking pan having a bracket connected to a part of its exterior wall, an upright removably seated in the said bracket, a substantially egg-shaped member adapted to be pressed into the material in the pan to form a recess in the top of the baked product, and a rod connected with the said member and hingedly connected with the upright.

In testimony whereof I affix my signature.

JOSEPH WATKINS.